(12) United States Patent
Wu et al.

(10) Patent No.: US 9,897,816 B2
(45) Date of Patent: Feb. 20, 2018

(54) GLASSES-FREE 3D LIQUID CRYSTAL DISPLAY DEVICE AND MANUFACTURING METHOD THEREOF

(71) Applicant: Shanghai Tianma Micro-Electronics Co., Ltd., Shanghai (CN)

(72) Inventors: Zhangben Wu, Shanghai (CN); Jun Ma, Shanghai (CN); Lei Niu, Shanghai (CN); Xingchen Wang, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 738 days.

(21) Appl. No.: 14/098,950

(22) Filed: Dec. 6, 2013

(65) Prior Publication Data

US 2014/0098308 A1 Apr. 10, 2014

Related U.S. Application Data

(63) Continuation of application No. PCT/CN2012/084268, filed on Nov. 8, 2012.

(30) Foreign Application Priority Data

Sep. 19, 2012 (CN) .......................... 2012 1 0350278

(51) Int. Cl.
*G02B 27/22* (2006.01)
*H04N 13/04* (2006.01)
(Continued)

(52) U.S. Cl.
CPC ......... *G02B 27/22* (2013.01); *G02B 27/2214* (2013.01); *G02F 1/134309* (2013.01);
(Continued)

(58) Field of Classification Search
None
See application file for complete search history.

(56) References Cited

U.S. PATENT DOCUMENTS 8,547,509 B2 * 10/2013 Moon ............... G02F 1/133345
349/113
2007/0132684 A1 * 6/2007 Baek ................... G09G 3/3614
345/87

(Continued)

FOREIGN PATENT DOCUMENTS

| CN | 102279494 A | 12/2011 |
| CN | 102636930 A | 8/2012 |
| EP | 2395391 A1 | 12/2011 |

OTHER PUBLICATIONS

Office Action for Chinese Application No. 20121035027832, dated Apr. 24, 2015, 13 pages total (English translation not available).
(Continued)

*Primary Examiner* — Edward Glick
*Assistant Examiner* — Anthony G Quash
(74) *Attorney, Agent, or Firm* — Alston & Bird LLP

(57) ABSTRACT

A glasses-free 3D liquid crystal display device includes an array substrate, a plurality of data lines disposed horizontally and a plurality of gate lines disposed vertically on the array substrate, a plurality of pixel units defined by the data lines and the gate lines. A pixel unit includes a first sub-pixel and a second sub-pixel that are horizontally disposed and adjacent to each other. The data line is a periodically varying flexuous line extending horizontally, in addition, or alternatively, the gate line is a periodically varying flexuous line extending vertically. The display device reduces the unevenness of moire fringes.

18 Claims, 13 Drawing Sheets

(51) Int. Cl.
*G02F 1/1343* (2006.01)
*G02F 1/1362* (2006.01)
*G02F 1/1335* (2006.01)

(52) U.S. Cl.
CPC ... *G02F 1/136286* (2013.01); *H04N 13/0404* (2013.01); *G02F 1/133526* (2013.01)

(56) References Cited

U.S. PATENT DOCUMENTS

| | | | |
|---|---|---|---|
| 2008/0001883 A1* | 1/2008 | Kim | G02F 1/134363 345/92 |
| 2008/0151150 A1* | 6/2008 | Lee | B82Y 20/00 349/106 |
| 2008/0204613 A1* | 8/2008 | Kim | G02F 1/133707 349/33 |
| 2010/0157185 A1* | 6/2010 | Kim | G02F 1/1362 349/38 |
| 2011/0147743 A1* | 6/2011 | Ahn | G02F 1/13378 257/57 |
| 2011/0149392 A1 | 6/2011 | Liao et al. | |
| 2011/0304601 A1* | 12/2011 | Niioka | G02B 27/2214 345/209 |

OTHER PUBLICATIONS

Search Report as issued in corresponding European Application No. 12879157.1, dated Nov. 17, 2015.

\* cited by examiner

US 9,897,816 B2

GLASSES-FREE 3D LIQUID CRYSTAL DISPLAY DEVICE AND MANUFACTURING METHOD THEREOF

STATEMENT AS TO RIGHTS TO INVENTIONS MADE UNDER FEDERALLY SPONSORED RESEARCH AND DEVELOPMENT

This application claims priority to and is a continuation of PCT/CN2012/084268, filed on Nov. 8, 2012 and entitled "GLASSES-FREE 3D LIQUID CRYSTAL DISPLAY DEVICE AND MANUFACTURING METHOD THEREOF," which claims the benefit of Chinese Patent Application No. 201210350278.2, filed with the Chinese Patent Office on Sep. 19, 2012, and entitled "Glasses-Free 3D Liquid Crystal Display Device and Manufacturing Method Thereof", the contents of which are incorporated herein by reference in their entirety.

TECHNICAL FIELD

The present invention relates to flat panel display technology, in particular to a glasses-free 3D liquid crystal display device and a manufacturing method thereof.

BACKGROUND OF THE INVENTION

Thanks to its gorgeous pictures and immersive vision impressions, a three-dimensional (3D) display technology has become more and more popular among users. However, users are required to wear a pair of 3D glasses with poor light sensitivity to enjoy the typical 3D display mode, which limits a wide range of applications of 3D technology and degrades comfortability thereof. In view of this, new technologies on glasses-free 3D display technology have been developed.

The glasses-free 3D technology mainly includes parallax barrier technology and cylindrical lens technology. Compared with the parallax barrier technology, the cylindrical lens technology has the advantage of unaffected brightness. FIG. 1 is a diagram showing the optical model of an image display method for the glasses-free 3D technology based on the cylindrical lens. As shown in FIG. 1, the glasses-free 3D liquid crystal display device 100 includes: a cylindrical lens array 110, a display panel 120 and a light source 130. The cylindrical lens array 110, the display panel 120 and the light source 130 are disposed in sequence along a direction from the viewer to the device 100, and pixel units 121 of the display panel 120 are disposed on the focal plane of the cylindrical lens array 110.

As shown in FIG. 1, each of the pixel units 121 includes a first sub-pixel 123 used for displaying a right-eye image, and a second sub-pixel 124 used for displaying a left-eye image, and the first sub-pixels 123 and the second sub-pixels 124 are alternately disposed on the display panel 120, and the first sub-pixel 123 and the second sub-pixel 124 form the pixel unit 121. The first sub-pixel 123 and the second sub-pixel 124 adjacent to the first sub-pixel 123 correspond to one of convex portions 111 of the cylindrical lens array 110. Light emitted from the light source 130 is split into light along directions towards the left eye and the right eye, respectively, after passing through the first sub-pixels 123, the second sub-pixels 124 and the convex portions 111 of the cylindrical lens array 110, so that different pictures can be seen by the left-eye and the right-eye. Thus, the viewer can see a stereoscopic picture.

As shown in FIGS. 1 and 2, the plurality of pixel units 121 are arranged as an array within the display panel 120, where each of the sub-pixel regions includes a Thin Film Transistor (TFT) 125. A plurality of data lines 126 and a plurality of gate lines 127 are disposed on the display panel 120, with each TFT 125 being connected with one of the data lines 126 and one of the gate lines 127, the cylindrical lens array 110 is arranged along the arrangement direction of the first sub-pixels 123 and the second sub-pixels 124, and the width of each lens in the lens array 110 is approximately equal to the width of the cross-section of the pixel unit 121, that is, for each lens, two of the three data lines 126 are respectively disposed at two boundaries of the lens and one of the three data lines 126 is disposed at a center position of the lens. Since the data line 126 and the gate line 127 are usually made of an opaque metal, after the light emitted from the light source 130 passes through the data lines 126, a portion of the lights passing through the data line region will be blocked by the data lines 126 so that the display gray scale is degraded. Furthermore, due to the enlargement by the lenses, the region of the degraded gray scale seen by a viewer would be enlarged, so that a number of uneven black bars, i.e., moire fringes, can be seen within the entire displaying region. FIG. 3 shows moire fringes generated by the cylindrical lens glasses-free 3D liquid crystal display device in FIG. 2, and the display effect of the glasses-free 3D is greatly deteriorated due to the presence of the moire fringes.

SUMMARY OF THE INVENTION

Embodiments of the present invention provide a glasses-free 3D liquid crystal display device, which includes: an array substrate, a plurality of data lines disposed horizontally and a plurality of gate lines disposed vertically on the array substrate, a plurality of pixel units defined by the data lines and the gate lines. A pixel unit comprises a first sub-pixel and a second sub-pixel, and the first sub-pixel and the second sub-pixels are horizontally adjacent to each other. A data line comprises a periodically varying flexuous line extending horizontally, in addition or alternatively, a gate line comprises a periodically varying flexuous line extending vertically.

Embodiments of the present invention also provide a manufacturing method of the glasses-free 3D liquid crystal display device. The manufacturing method of the glasses-free 3D liquid crystal display device includes providing an array substrate, forming a plurality of data lines disposed horizontally and a plurality of gate lines disposed vertically on the array substrate, and defining a plurality of pixel units by the data lines and the gate lines. Each of the sub-pixels includes a first sub-pixel and a second sub-pixel, and the first sub-pixel and the second sub-pixel are horizontally adjacent to each other. The data line comprises a periodically varying flexuous line extending horizontally, in addition or alternatively, the gate line comprises a periodically varying flexuous line extending vertically.

DESCRIPTION OF THE SPECIFIC EMBODIMENTS

The concept of the present invention lies in that, the data line comprises a periodically varying flexuous line extending horizontally, in addition or alternatively, the gate line comprises a periodically varying flexuous line extending vertically. Since the periodic structure of the data line or the gate line has a certain angle with the periodic arrangement of the lenses, the unevenness of moire fringes seen by a viewer will be diminished.

Furthermore, both the gate electrode of the TFT of the first sub-pixel of the pixel unit and the gate electrode of the TFT of the first sub-pixel of a pixel unit vertically adjacent to said pixel unit are connected to the same gate line, and both the gate electrode of the TFT of the second sub-pixel of said pixel unit and the gate electrode of the TFT of the second sub-pixel of a pixel unit vertically adjacent to said pixel unit are connected to the same gate line, and two TFTs connected to the same gate line are electrically connected with different data lines. With such design, the gate line at the center position of the lens is greatly diminished or even eliminated, accordingly, the corresponding one of the moire fringes arising from said gate line will be eliminated, that is, the number of moire fringes is reduced.

The embodiments of the present invention will be described below in detail with reference to the drawings, in order to make the objects, technical solutions and advantages of the present invention more clear.

First Embodiment

Figure 1:
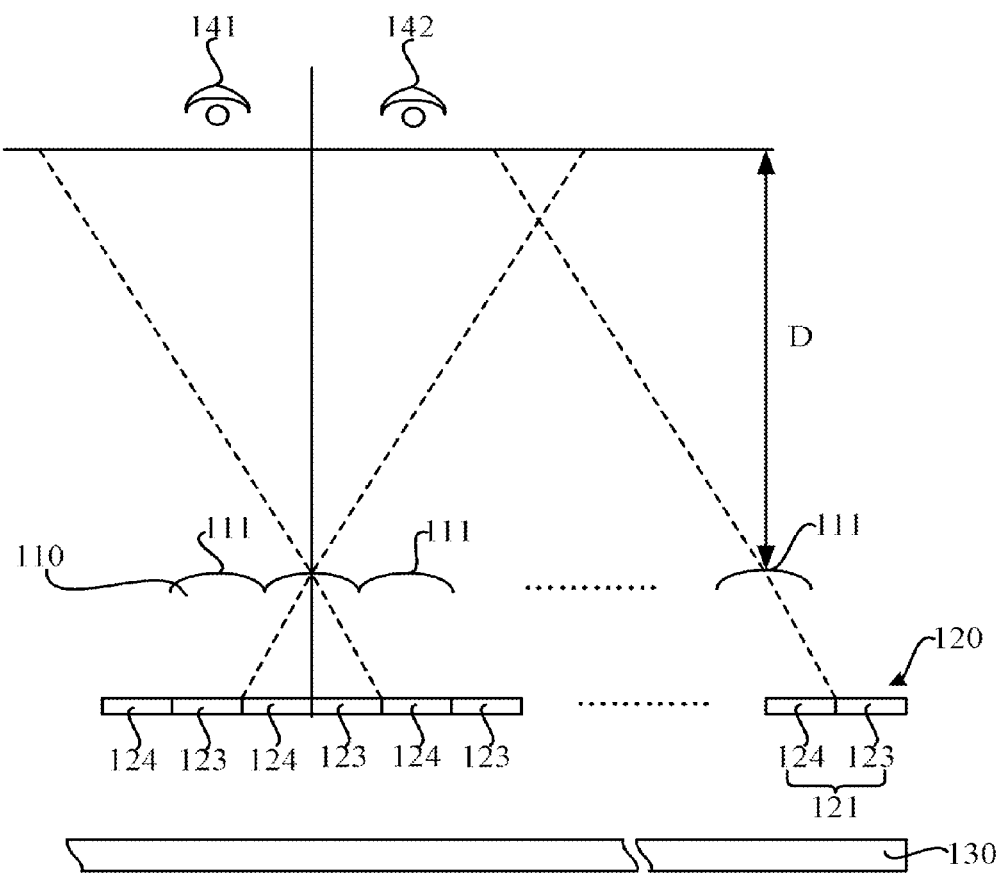
FIG. 1 is a diagram showing the optical model of a glasses-free 3D image display method based on cylindrical lens.
Figure 2:
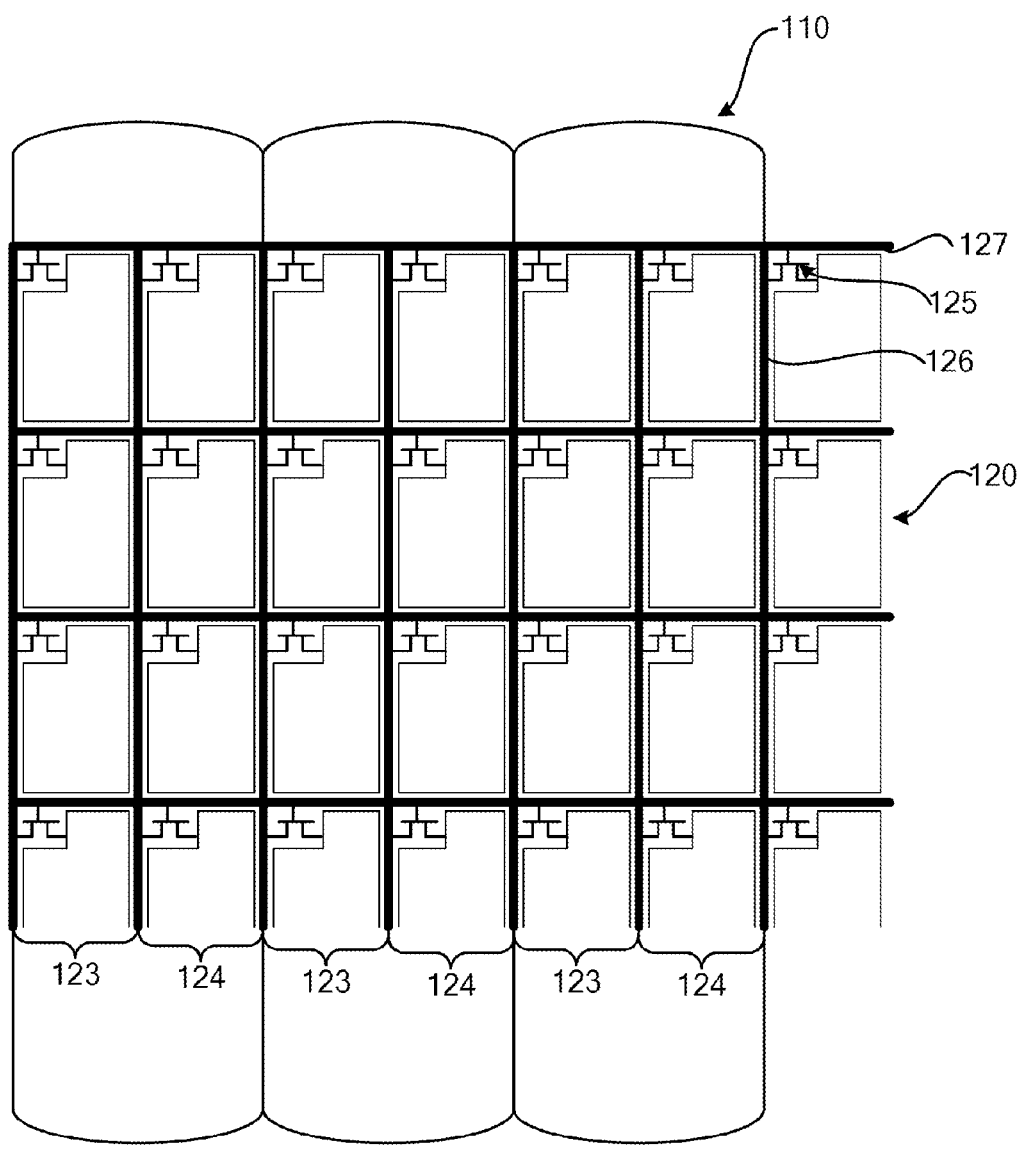
FIG. 2 is a perspective view showing the existing glasses-free 3D liquid crystal display device.
Figure 3:
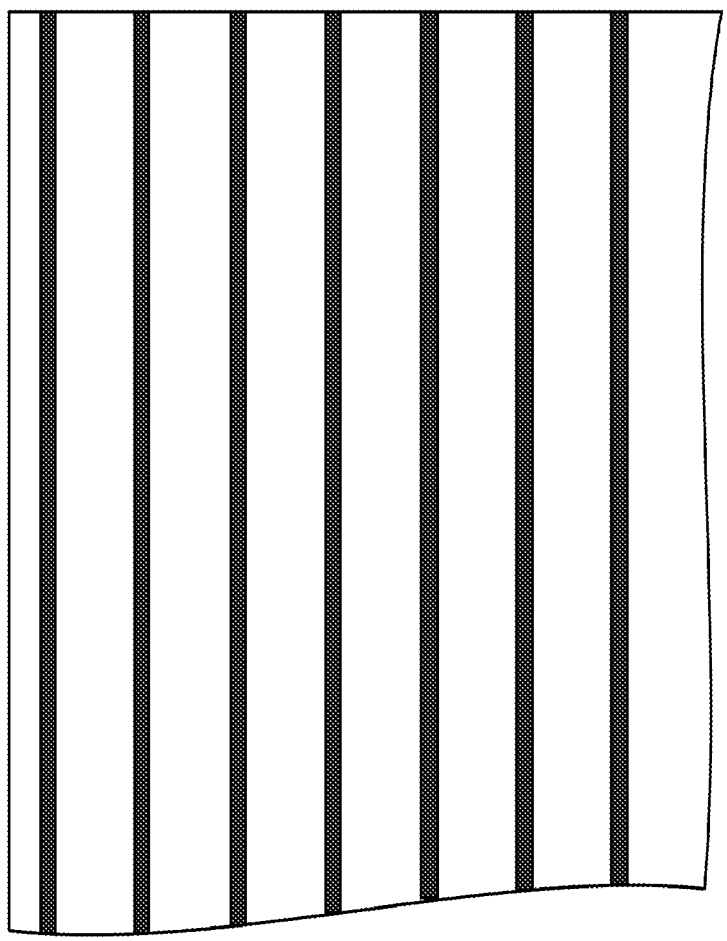
FIG. 3 is a schematic diagram showing the moire fringes generated by the glasses-free 3D liquid crystal display device in FIG. 2.
Figure 4:
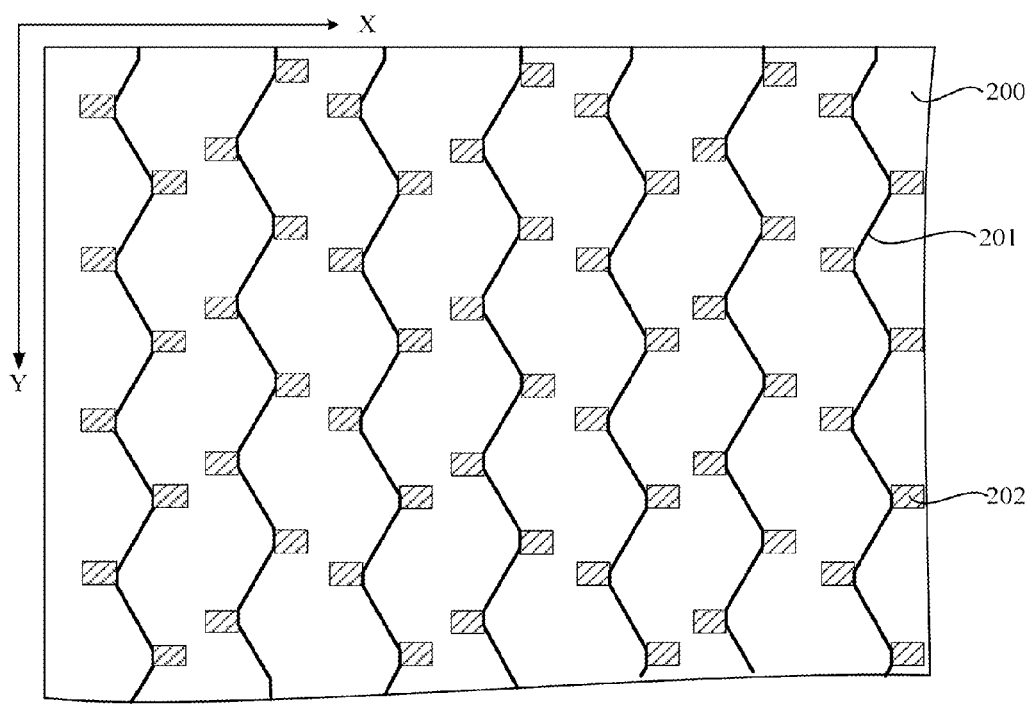
FIG. 4 is a top view showing the array substrate with the formed gate lines according to a first embodiment of the present invention.

Firstly, as shown in FIG. 4, an array substrate 200 is provided, and a plurality of gate lines 201 disposed vertically and a plurality of gate electrodes 202 integrated with the gate lines are formed on the array substrate 200. The gate lines 202 are periodically varying flexuous lines extending vertically. In the present specification, the x-direction (first direction) in FIG. 4 is defined as the horizontal direction, and the y-direction (second direction) in FIG. 4 is defined as the vertical direction.

Figure 5:
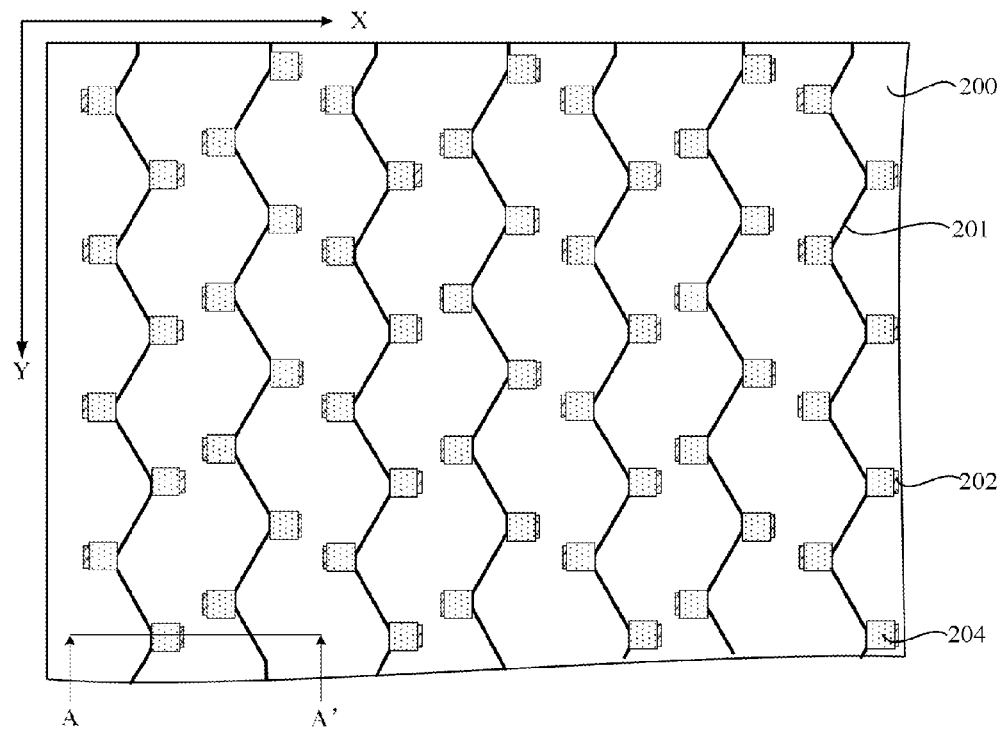
FIG. 5 is a top view showing the array substrate with the formed gate insulating layer and active layer according to the first embodiment of the present invention.
Figure 6:
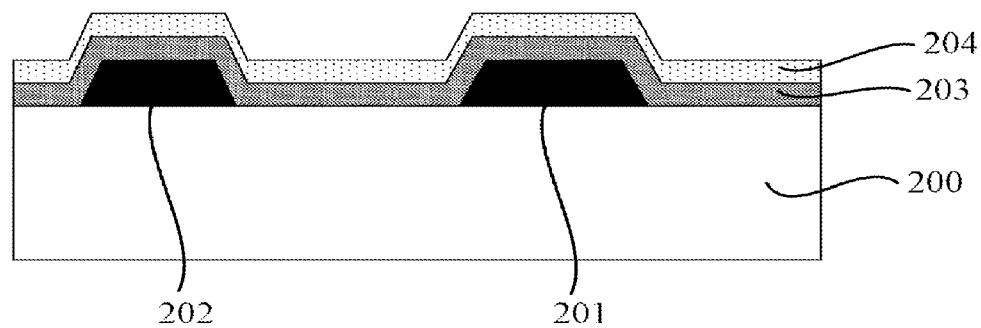
FIG. 6 is a sectional view taken along the line A-A' of FIG. 5.

Subsequently, as shown in FIGS. 5 and 6, a gate insulating layer 203 and a semiconductor active layer 204 are sequentially formed on both the gate electrodes 202 and the gate lines 201.

Figure 7:
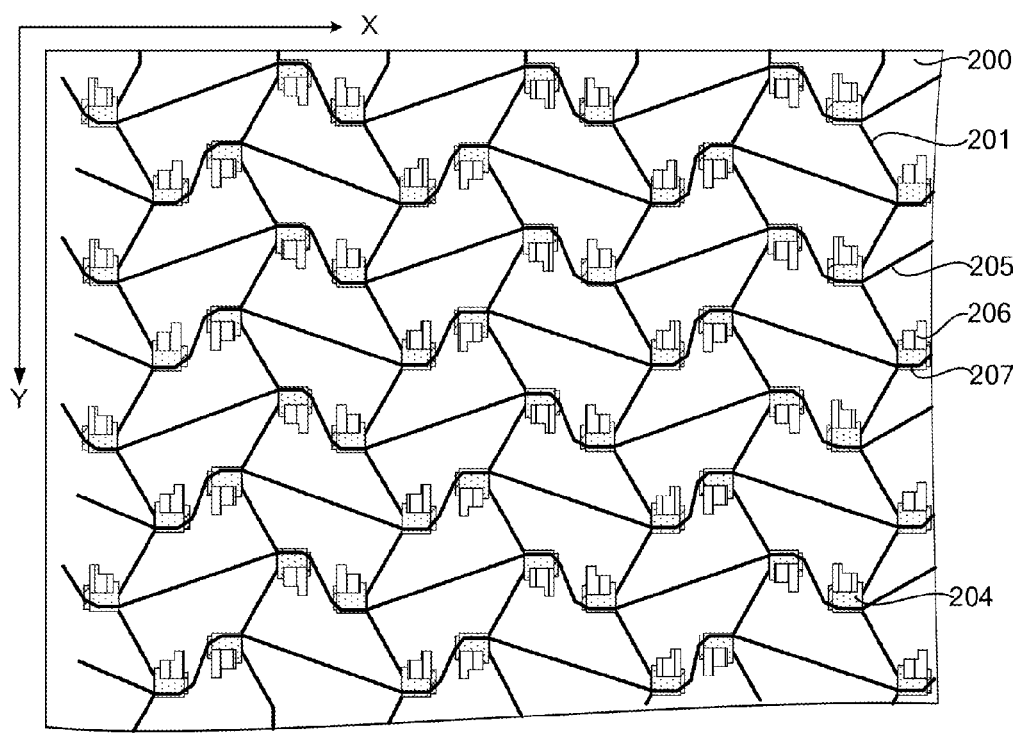
FIG. 7 is a top view showing the array substrate with the formed data lines and TFTs according to the first embodiment of the present invention.

Subsequently, as shown in FIG. 7, data lines 205, drain electrodes 206 and source electrodes 207 integrated with the data lines 205 are formed on the array substrate 200, and a portion of the drain electrode 206 and a portion of the source electrode 207 are lap jointed onto the semiconductor active layer 204. The data lines 205 are periodically varying flexuous lines extending horizontally.

Figure 8:
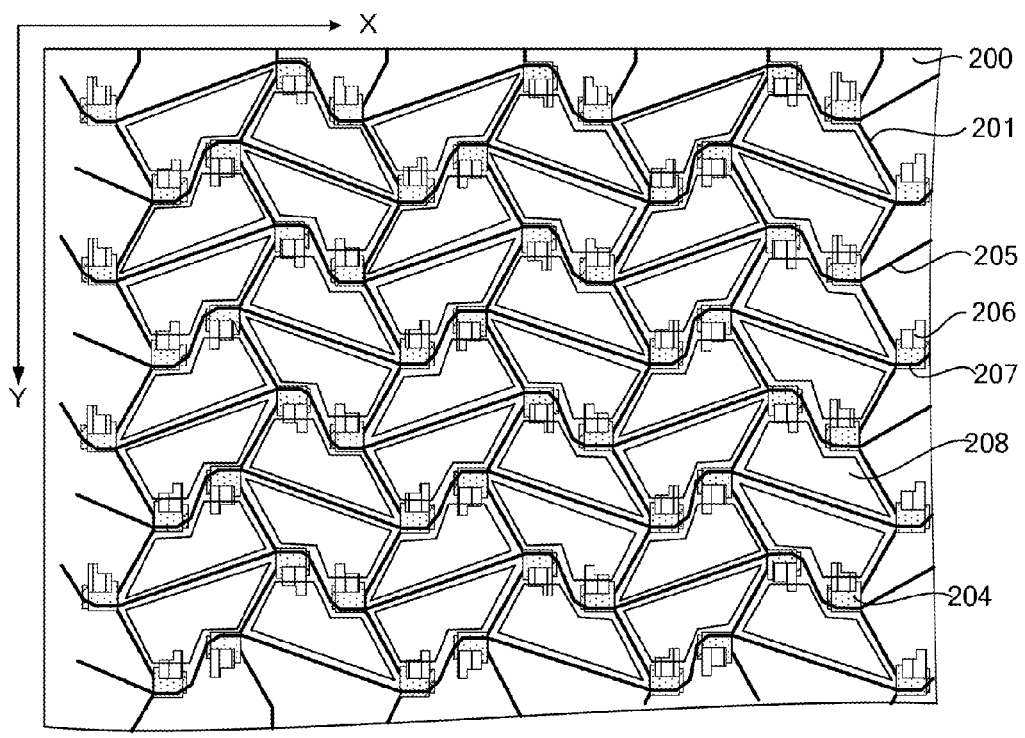
FIG. 8 is a top view showing the array substrate with the formed pixel electrodes according to the first embodiment of the present invention.

Subsequently, as shown in FIG. 8, pixel electrodes 208 connected with the drain electrodes 206 are formed on the array substrate 200.

Figure 9:
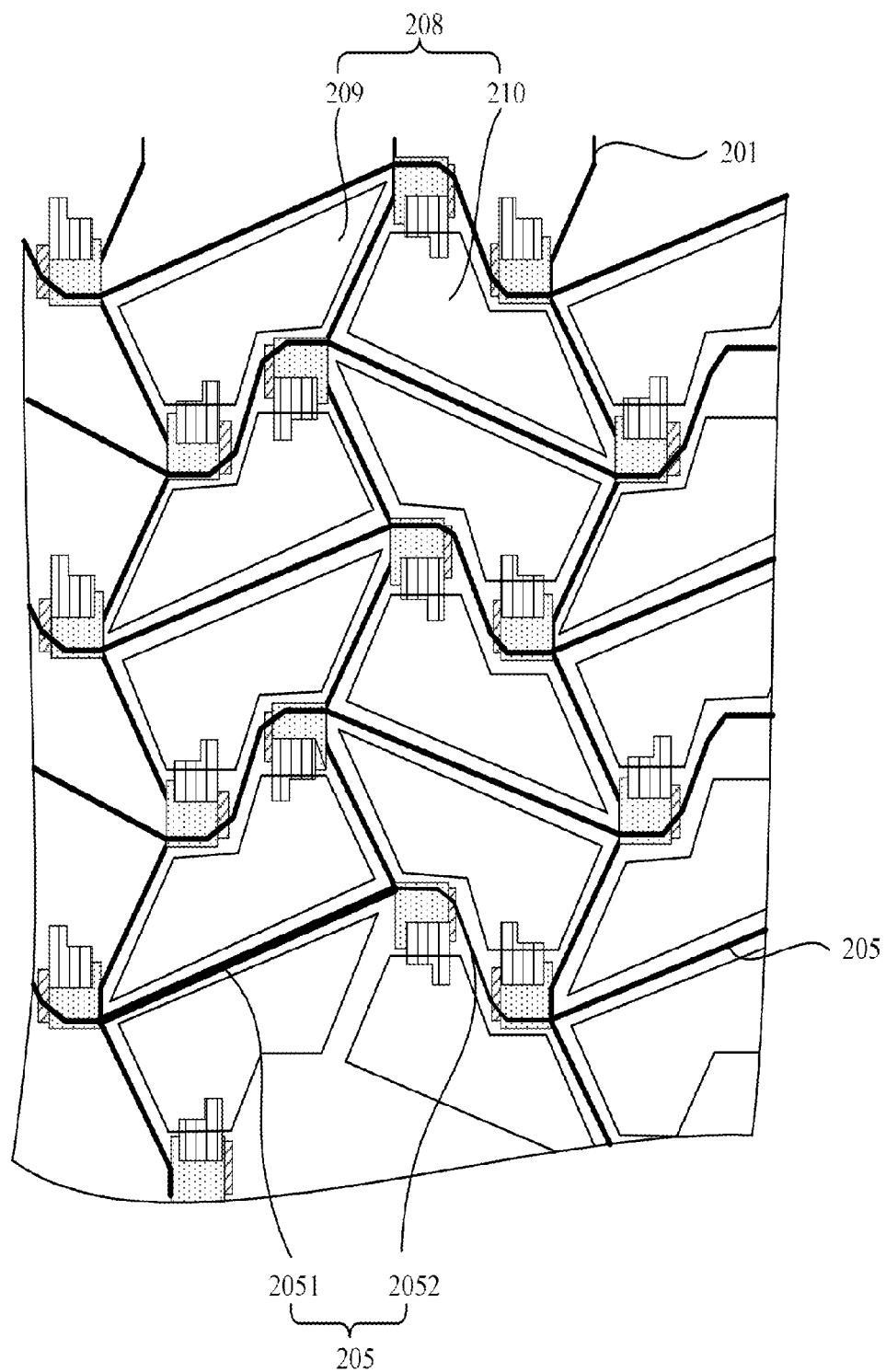
FIG. 9 is a partially enlarged view of FIG. 8.

FIG. 9 is a partially enlarged view of FIG. 8, each of a plurality of pixel units 208 defined by the data lines 205 and the gate lines 201 includes a first sub-pixel 209 and a second sub-pixel 210, and the first sub-pixel 209 and a second sub-pixel 210 are substantially horizontally disposed and adjacent to each other. The first sub-pixel 209 and the second sub-pixel 210 are substantially trapezoidal-shaped and inclined in opposite directions, i.e., if the first sub-pixel 209 is inclined upward with regard to the horizontal direction, the second sub-pixel 210 is inclined downward with regard to the horizontal direction. The first sub-pixel 209 and the second sub-pixel 210 each have a pixel electrode 210.

Referring still to FIG. 9, the data line 205 in each period includes a first portion of the data line 2051 which is inclined with regard to the horizontal direction, and a second portion of the data line 2052 which is connected to the first portion of the data line 2051 and is reversely inclined with regard to the horizontal direction. In this embodiment, the first portion of the data line 2051 is a straight line, and the second portion of the data line 2052 is a flexuous line. It should be noted that for illustration, the first portion of the data line 2051 is bold and the second portion of the data line 2052 is thin in FIG. 9 so as to distinguish from other data lines, however, it should be known by those skilled in the art that the thickness of the data line 205 can be equal. In the pixel unit 208, one of the corresponding data lines has the straight first portion 2051 of the data line and the flexuous second portion 2052 of the data line, and the other of the corresponding data lines has the flexuous first portion 2051 of the data line and the straight second portion 2052 of the data line. Of course, it is possible that the first portion 2051 of the data line is flexuous and the second portion 2052 of the data line is straight.

In FIG. 9, only the region of the pixel electrode 208 is the effective display region, but other regions which are blocked by means of light blocking means in displaying are regarded as the ineffective display regions, therefore, a main method for increasing the aperture ratio lies in fully increasing the area of the effective display region. In the present embodiment, the thin film transistors of the first sub-pixels 209 of the vertically adjacent pixel units 208 are disposed in reverse direction or oppositely staggered to each other, and the thin film transistors of the second sub-pixels 210 of the vertically adjacent pixel units 208 are disposed opposite or in reversely staggered to each other. By means of the structure of the first portion 2051 of the data line and the second portion 2052 of the data line, the area of the region of the pixel electrode 208 can be fully expanded, so that the aperture ratio of the array substrate 200 can be effectively increased. It should be understood that regardless of the aperture ratio, each of sub-pixels may also be arranged in order and in alignment, and both the first portion 2051 of the data line and the second portion 2052 of the data line are straight.

Thereafter, a dielectric layer (not shown) is formed on the pixel electrodes 208; and a common electrode is formed on the dielectric layer, preferably, the common electrode is comb-shaped.

Figure 10:
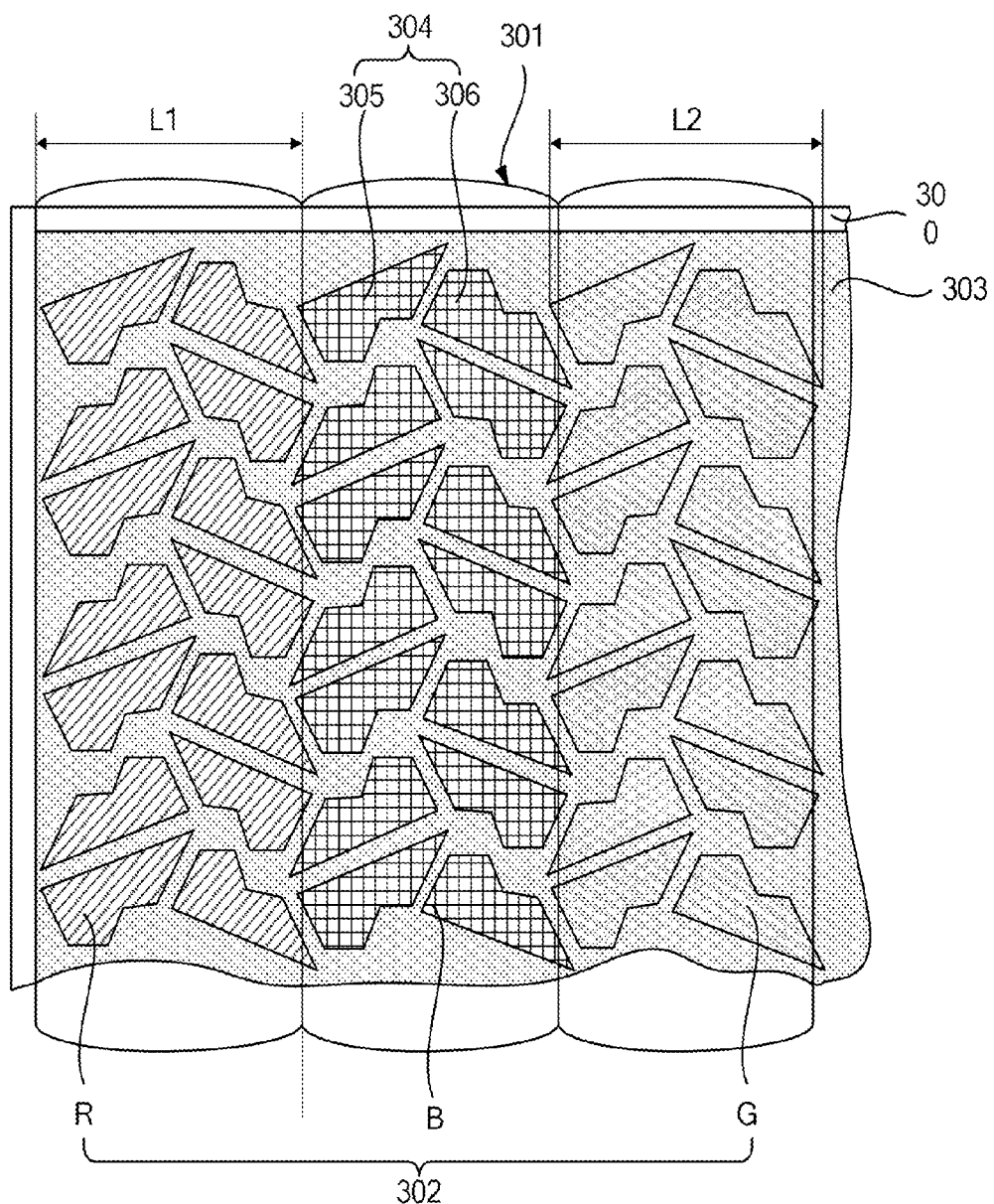
FIG. 10 is a top view showing a color filter substrate according to the first embodiment of the present invention.

Thereafter, as shown in FIG. 10, a color filter substrate 300 is provided, a lens array 301 is formed on one side of the color filter substrate 300; and a color filter plate 302 and a black matrix 303 are formed on the opposite side of color filter substrate 300. The color filter plate 302 includes a red filter plate (R), a green filter plate (G) and a blue filter plate (B). The color filter plate 302 further includes an color filter unit 304, the color filter unit 304 corresponds to the pixel unit 208 on the array substrate 200, and the color filter unit 304 includes a first color filter sub-pixel 305 corresponding to the first sub-pixel 209 on the array substrate 200 and a second color filter sub-pixel 306 corresponding to the second sub-pixel 210 on the array substrate 200. The first color filter sub-pixel 305 and the second color filter sub-pixel 306 adopt the same kind color filter. Each lens in the lens array 301 has a width L1 that is equal to or less than the width L2 of the cross-section of the pixel unit along the horizontal direction, and the lens array is arranged horizontally.

Figure 11:
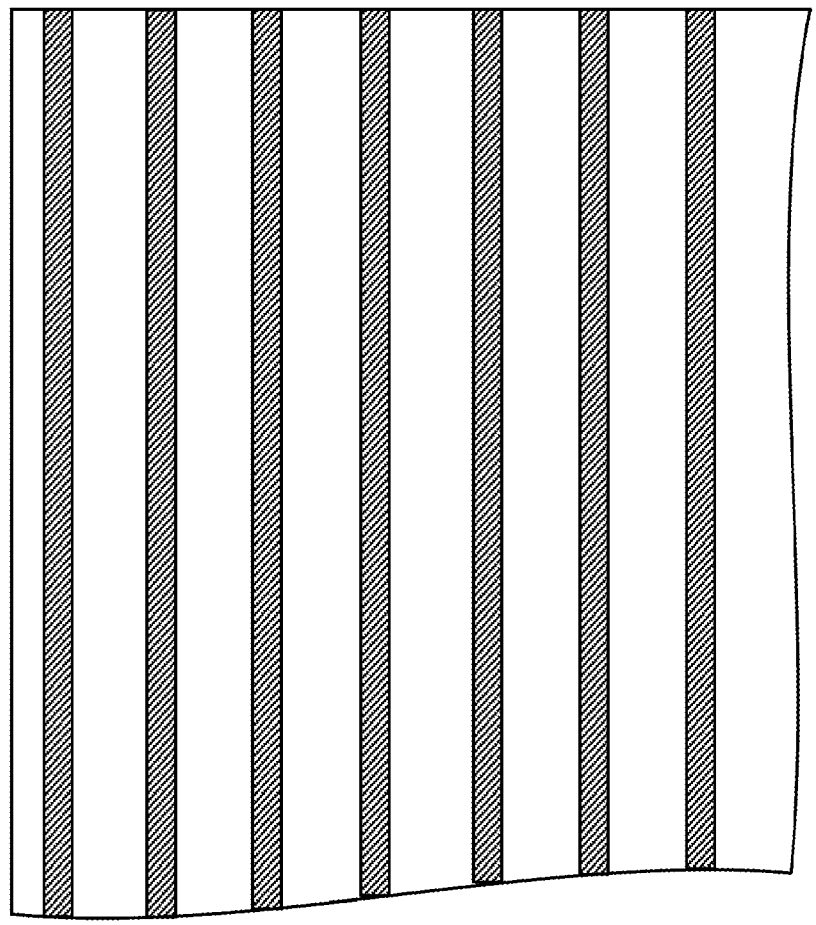
FIG. 11 is a schematic diagram showing the moire fringes generated by the glasses-free 3D liquid crystal display device according to the first embodiment of the present invention.

Next, the array substrate 200 and the color filter substrate 300 are bonded to each other, and liquid crystals are filled in the space formed by the array substrate 200 and the color filter substrate 300, to form the glasses-free 3D liquid crystal display device. Since the gate line 202 is disposed as a periodically varying flexuous line, the periodically varying flexuous line extends vertically, the light towards the gate lines 202 would be blocked, and since the gate line 202 is flexuous line, in the entire regions occupied by the gate lines 202, the flexuous gate lines formed several groups of different periodic structures at a certain angle to periodic structures of the lenses, as compared with the straight gate lines, so that the moire fringes are diminished. As shown in FIG. 11, the unevenness of moire fringes seen by the human eyes is diminished.

The generation of moire fringes is because the period of the gate lines or data lines arranged in the same direction with the lens array is the same or similar with the period of the lens array. After the data lines or the gate lines arranged along the arrangement direction of the lens array are disposed as flexuous lines, the resulting moire fringes will be diminished. It should be understood that, as long as the data lines or the gate lines arranged along the arrangement direction of the lens array are disposed as flexuous lines, the effect that moire fringes are diminished can be achieved, but in order to improve the aperture ratio of the array substrate, both the data lines and the gate lines may be disposed as a periodically varying flexuous line.

Second Embodiment

The difference between the second embodiment and the first embodiment is that both the gate electrode of the TFT of the first sub-pixel of the pixel unit and the gate electrode of the TFT of the first sub-pixel of a pixel unit vertically adjacent to the pixel unit are connected to the same gate line so as to form a dual source structure, so that the gate line at the center position of the lens disappear, accordingly, the corresponding one of the moire fringes arising from said gate line will be greatly diminished or disappear.

The steps of the manufacturing method in the present embodiment are the same with the steps of the manufacturing method in the first embodiment and will not be repeated herein for brevity.

Figure 12:
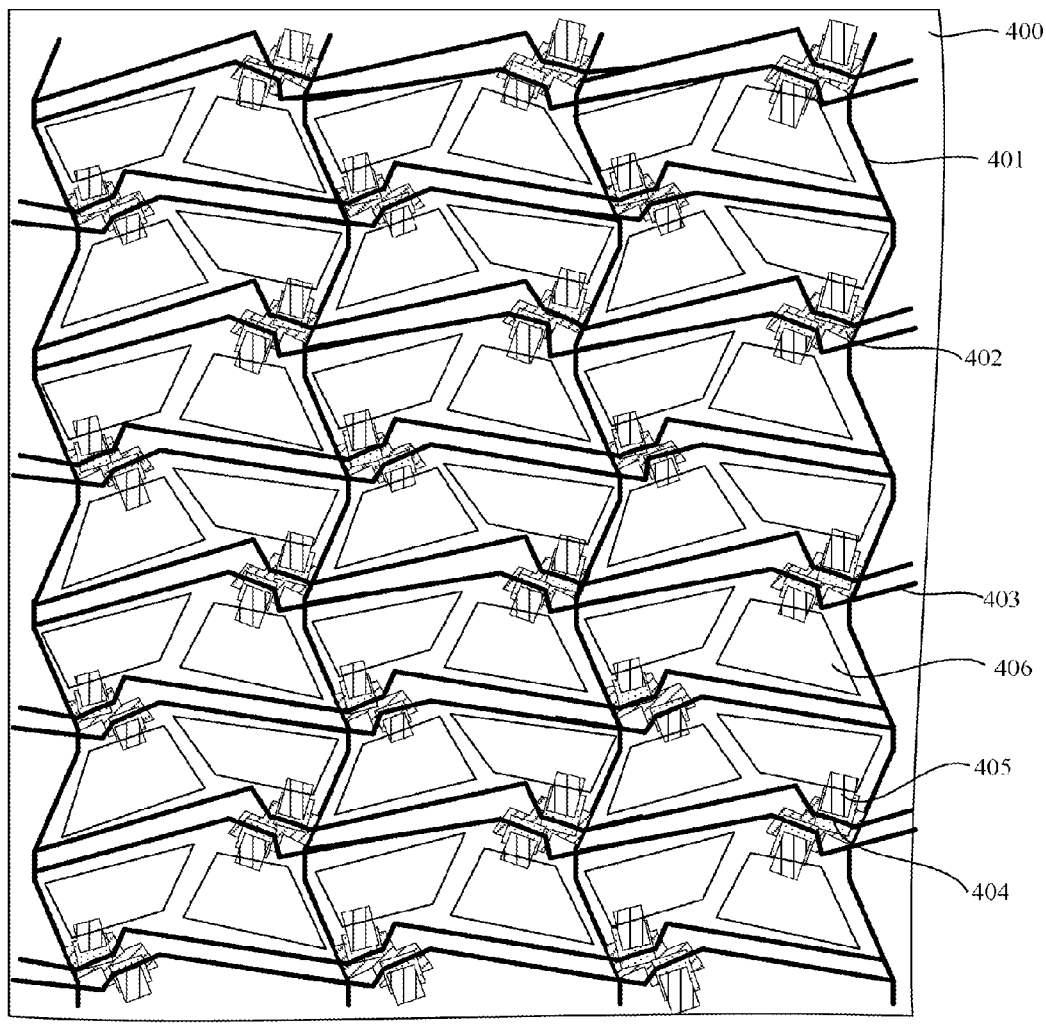
FIG. 12 is a top view showing the array substrate with the formed pixel electrodes according to a second embodiment of the present invention.

Firstly, as shown in FIG. 12, it is provided an array substrate 400, a plurality of gate lines 401 disposed vertically and gate electrodes 402 integrated with the gate lines are formed on the array substrate 400.

Next, referring still to FIG. 12, data lines 403, drain electrodes 404 and source electrodes 405 integrated with data lines 403 are formed on the array substrate 400, and a portion of the drain electrode 404 and a portion of the source electrode 405 are lap-jointed onto the semiconductor active layer. The data lines 403 are periodically varying flexuous lines extending horizontally. Pixel electrodes 406 connected to the drain electrodes 404 are formed on the array substrate 400.

Figure 13:
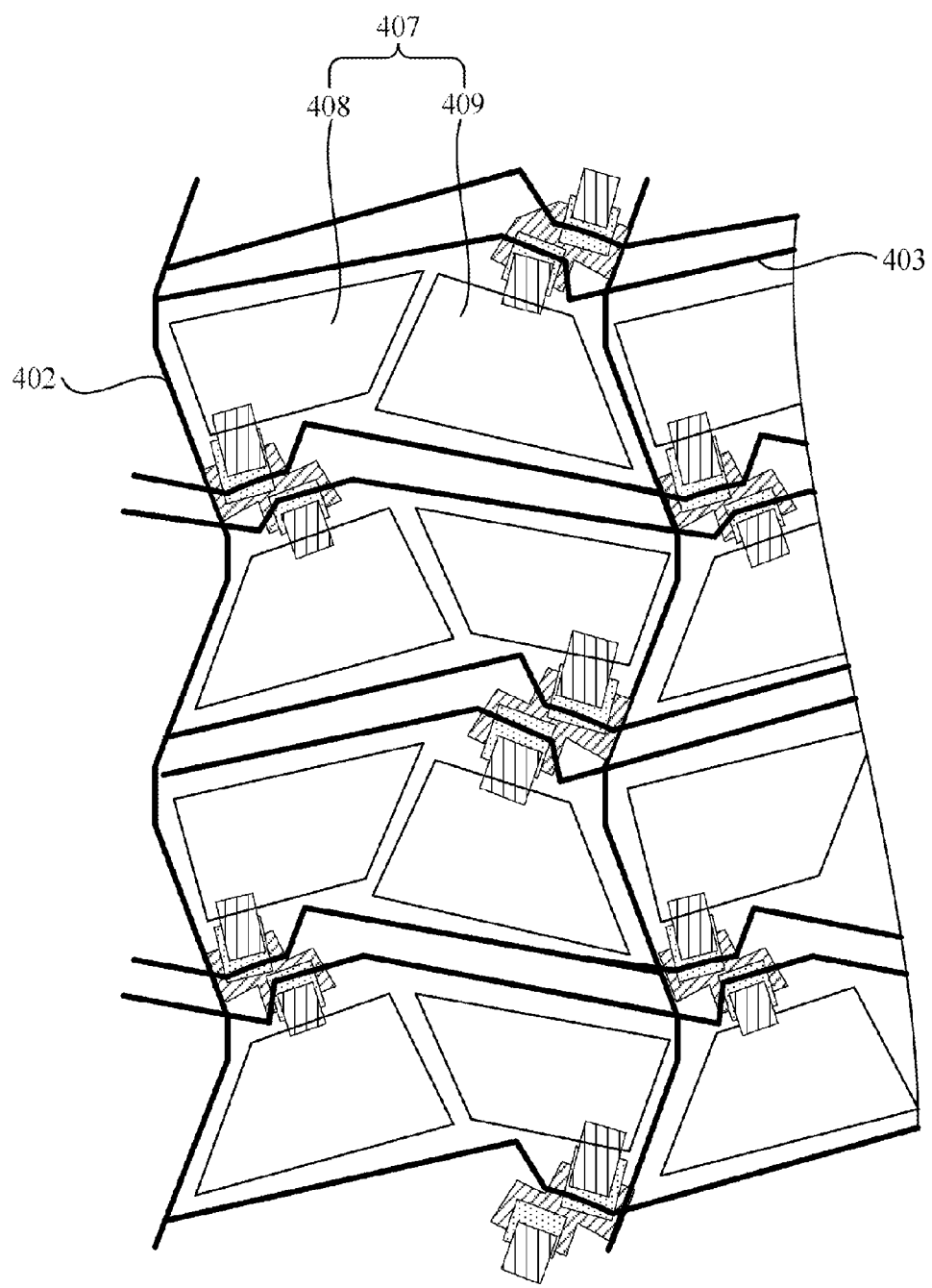
FIG. 13 is a partially enlarged view of FIG. 12.

As shown in FIG. 13, each of a plurality of pixel units 407 defined by the data lines 403 and the gate lines 401 includes a first sub-pixel 408 and a second sub-pixel 409, and the first sub-pixel 408 and a second sub-pixel 409 are disposed horizontally and adjacent to each other. The first sub-pixel 408 and the second sub-pixel 409 each have a pixel electrode. The first sub-pixel 408 and the second sub-pixel 409 each have a TFT, and both the gate electrode of the TFT of the first sub-pixel 408 of the pixel unit 407 and the gate electrode of the TFT of the first sub-pixel 408 of a pixel unit vertically adjacent to the pixel unit 407 are connected to the same first gate line, both the gate electrode of the TFT of the second sub-pixel 409 of the pixel unit 407 and the gate electrode of the TFT of the second sub-pixel 409 of a pixel unit vertically adjacent to said pixel unit 407 are connected to the same second gate line, and two TFTs connected to the same gate line are electrically connected with different data lines 403.

Figure 14:
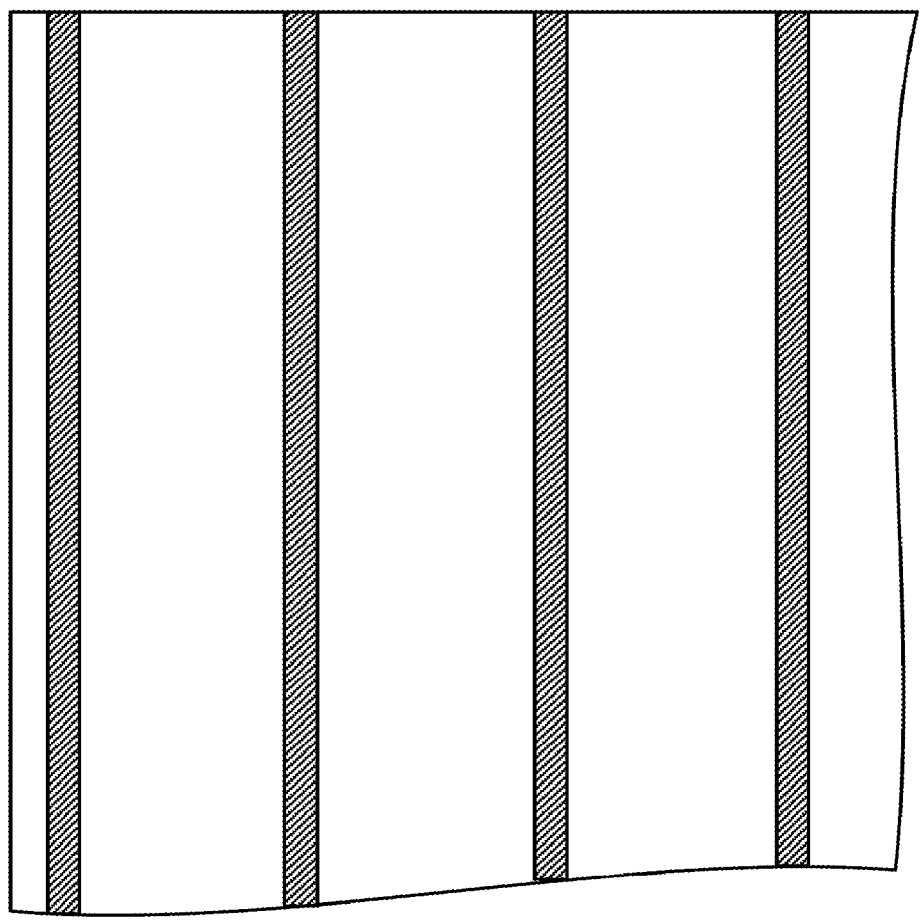
FIG. 14 is a schematic diagram showing the moire fringes generated by the glasses-free 3D liquid crystal display device according to the second embodiment of the present invention.

In the second embodiment, a dual source structure is employed, that is, both the gate electrode of the TFT of the first sub-pixel of the pixel unit and the gate electrode of the TFT of the first sub-pixel of a pixel unit vertically adjacent to the pixel unit are connected to the same first gate line, while both the gate electrode of the TFT of the second sub-pixel of the pixel unit and the gate electrode of the TFT of the second sub-pixel of a pixel unit vertically adjacent to said pixel unit are connected to the same second gate line, and two TFTs connected to the same gate line are electrically connected with different data lines. As shown in FIG. 14, with the dual source structure, the gate line at the center position of the lens disappears, accordingly, the corresponding one of the moire fringes arising from said gate line will be greatly diminished or even disappears. Meanwhile, since both the TFT of the second sub-pixel of the pixel unit and the TFT of the second sub-pixel of a pixel unit vertically adjacent to said pixel unit share one gate line, the scanning power can be reduced.

In summary, with the periodically varying data lines, in addition or alternatively, the periodically varying gate lines employed by the present invention, since the periodic structure for the data line or gate line has a certain angle with the periodic arrangement of the lenses, the unevenness of moire fringes seen by a viewer will be diminished. Furthermore, when the dual source structure is employed, the region occupied by the gate line at the center position of the lens is eliminated, accordingly, the corresponding one of the moire fringes arising from said gate line will be greatly diminished or even eliminated, so as to achieve the purposes of diminishing the unevenness of moire fringes and reducing the number of moire fringes.

It should be noted that in this specification, various embodiments are described by way of progressive manner, and each of the embodiments focuses on the difference with the other embodiments in terms of the illustration, and the same or similar parts between the various embodiments may refer to each other.

It is apparent that various modifications and variations can be made for the present invention by those skilled in the art without departing from the spirit and scope of thereof. Thus, if these modifications and variations of the present invention pertain to the claims thereof and are within the scope of equivalent technologies thereof, the present invention is also intended to cover such modifications and variations.

What is claimed is:

1. A glasses-free 3D liquid crystal display device, comprising:
    an array substrate;
    a color filter substrate;
    a plurality of data lines and a plurality of gate lines disposed on the array substrate, wherein the plurality of data lines are arranged in a first direction and substantially extend in a second direction, the plurality of gate lines are arranged in the second direction and substantially extend in the first direction;
    a plurality of pixel units defined by the data lines and the gate lines, wherein any two adjacent pixel units in the second direction are separated by one of the plurality of gate lines and any two adjacent pixel units in the first direction are separated by two of the plurality of data lines;
    a color filter plate disposed on the color filter substrate and including a red filter, a green filter and a blue filter, wherein each of the red filter, the green filter and the blue filter extends in the first direction; and
    a plurality of cylindrical lenses arranged in the second direction and extending in the first direction, wherein each of the plurality of cylindrical lenses corresponds to a respective column of pixel units in the first direction,
    wherein each column of pixel units corresponds to one of the red filter, the green filter and the blue filter,
    wherein each of the plurality of pixel units comprises a first sub-pixel and a second sub-pixel, the first sub-pixel and the second sub-pixel being disposed in the second direction and adjacent to each other, no gate line is between the first sub-pixel and the second sub-pixel in a same pixel unit, each of the first sub-pixel and the second sub-pixel comprises a thin film transistor (TFT) having a gate electrode;
    wherein the gate electrode of a TFT of a first sub-pixel of a first pixel unit and the gate electrode of a TFT of a first sub-pixel of a second pixel unit disposed adjacent to the first pixel unit in the first direction are connected to a same first gate line, the TFT of the first sub-pixel of the first pixel unit is connected to a first one of the two data lines which separate the first pixel unit and the second pixel unit, and the TFT of the first sub-pixel of the second pixel unit is connected to a second one of the two data lines which separate the first pixel unit and the second pixel unit; and
    wherein the gate electrode of a TFT of a second sub-pixel of the first pixel unit and the gate electrode of a TFT of a second sub-pixel of a third pixel unit disposed adjacent to the first pixel unit in the first direction are connected to a same second gate line, the TFT of the second sub-pixel of the first pixel unit is connected to a first one of the two data lines which separate the first pixel unit and the third pixel unit, and the TFT of the second sub-pixel of the third pixel unit is connected to a second one of the two data lines which separate the first pixel unit and the third pixel unit.

2. The device according to claim 1, wherein the first sub-pixel and the second sub-pixel are substantially trapezoidal-shaped, and the first sub-pixel and the second sub-pixel are inclined in reverse directions.

3. The device according to claim 1, wherein the TFT comprises:
    a gate insulating layer disposed on the gate electrodes and the gate lines;
    a semiconductor active layer disposed on the gate insulating layer; and
    drain electrodes and source electrodes integrated with the data lines, and a portion of the drain electrode and a portion of the source electrode being lap jointed onto the semiconductor active layer; and wherein the plurality of pixel units comprises:
    pixel electrodes connected with the drain electrodes and disposed on the drain electrodes and a portion of the array substrate;
    a dielectric layer disposed on the pixel electrodes; and
    a common electrode disposed on the dielectric layer.

4. The device according to claim 3, wherein the first sub-pixel and the second sub-pixel each have a pixel electrode.

5. The device according to claim 1, further comprising:
    a black matrix arranged on the color filter substrate,
    wherein each of the plurality of cylindrical lenses has a width equal to a width of a cross-section of the pixel unit.

6. The device according to claim 5, wherein the color filter plate has a same shape as a shape of a corresponding pixel.

7. The device according to claim 1, wherein each of the plurality of gate lines consists of a plurality of first sub lines and a plurality of second sub lines, each of the plurality of first sub lines is inclined with respect to the first direction and each of the plurality of second sub lines is reversely inclined with respect to the first direction.

8. The device according to claim 1, wherein pixel units in a same column display a same color.

9. The device according to claim 1, wherein in each pixel unit, the first sub-pixel and the second sub-pixel display a same color.

10. A manufacturing method of the glasses-free 3D liquid crystal display device, comprising:
    providing an array substrate;
    forming a plurality of data lines and a plurality of gate lines on the array substrate, wherein the plurality of data lines are arranged in a first direction and substantially extend in a second direction, the plurality of gate lines are arranged in the second direction and substantially extend in the first direction;
    defining a plurality of pixel units by the data lines and the gate lines, each of the pixel units comprising a first sub-pixel and a second sub-pixel, the first sub-pixel and the second sub-pixel being disposed in the second direction and adjacent to each other and no gate line being between the first sub-pixel and the second sub-pixel in a same pixel unit, wherein any two adjacent pixel units in the second direction are separated by one of the plurality of gate lines, any two adjacent pixel units in the first direction are separated by two of the plurality of data lines and each of the first sub-pixel and the second sub-pixel comprises a TFT having a gate electrode;

providing a color filter substrate;

forming a color filter plate on the color filter substrate, wherein the color filter plate includes a red filter, a green filter and a blue filter, each of the red filter, the green filter and the blue filter extends in the first direction; and providing a plurality of cylindrical lenses arranged in the second direction and extending in the first direction, wherein each of the plurality of cylindrical lenses corresponds to a respective column of pixel units in the first direction, wherein each column of pixel units corresponds to one of the red filter, the green filter and the blue filter, wherein the gate electrode of a TFT of a first sub-pixel of a first pixel unit and the gate electrode of TFT of a first sub-pixel of a second pixel unit disposed adjacent to the first pixel unit in the first direction are connected to a same first gate line, the TFT of the first sub-pixel of the first pixel unit is connected to a first one of the two data lines which separate the first pixel unit and the second pixel unit, and the TFT of the first sub-pixel of the second pixel unit is connected to a second one of the two data lines which separate the first pixel unit and the second pixel unit; and wherein the gate electrode of a TFT of a second sub-pixel of the first pixel unit and the gate electrode of a TFT of a second sub-pixel of a third pixel unit disposed adjacent to the first pixel unit in the first direction are connected to a same second gate line, the TFT of the second sub-pixel of the first pixel unit is connected to a first one of the two data lines which separate the first pixel unit and the third pixel unit, and the TFT of the second sub-pixel of the third pixel unit is connected to a second one of the two data lines which separate the first pixel unit and the third pixel unit.

11. The method according to claim 10, wherein the first sub-pixel and the second sub-pixel are substantially trapezoidal-shaped.

12. The method according to claim 10, wherein the data lines, the gate lines and the pixel units are formed by the following steps of:

forming the gate lines and gate electrodes integrated with the gate lines on the array substrate;

sequentially forming a gate insulating layer and a semiconductor active layer on both the gate electrodes and the gate lines;

forming the data lines, drain electrodes as well as source electrodes integrated with the data lines on the array substrate, wherein a portion of the drain electrode and a portion of the source electrode are lap jointed onto the semiconductor active layer;

forming pixel electrodes connected with the drain electrodes on the array substrate;

forming a dielectric layer on the pixel electrodes; and forming a common electrode on the dielectric layer.

13. The method according to claim 12, wherein the first sub-pixel and the second sub-pixel each have a pixel electrode.

14. The method according to claim 10, further comprising:

forming a black matrix on the color filter substrate.

15. The method according to claim 14, wherein the color filter plate has a same shape as a shape of a corresponding pixel unit.

16. The method according to claim 10, wherein each of the plurality of gate lines consists of a plurality of first sub lines and a plurality of second sub lines, each of the plurality of first sub lines is inclined with respect to the first direction and each of the plurality of second sub lines is reversely inclined with respect to the first direction.

17. The method according to claim 10, wherein pixel units in a same column display a same color.

18. The method according to claim 10, wherein in each pixel unit, the first sub-pixel and the second sub-pixel display a same color.

* * * * *